United States Patent [19]

Huckabay

[11] 4,434,142
[45] Feb. 28, 1984

[54] METHOD FOR TREATMENT OF ALUMINUM DROSS OXIDES

[75] Inventor: John A. Huckabay, Beaverton, Oreg.

[73] Assignee: Imperial West Chemical Company, Reno, Nev.

[21] Appl. No.: 426,200

[22] Filed: Sep. 28, 1982

[51] Int. Cl.³ ............................................. C01F 7/02
[52] U.S. Cl. .................................. 423/111; 423/353; 423/1; 585/700; 203/20
[58] Field of Search ....................... 423/111; 252/321; 203/20

[56] References Cited

U.S. PATENT DOCUMENTS

| | | | |
|---|---|---|---|
| 2,027,115 | 1/1936 | Oman et al. | 203/20 |
| 3,955,969 | 5/1976 | Johnson | 423/111 |
| 4,160,815 | 7/1979 | Huckabay | 423/111 |
| 4,252,776 | 2/1981 | Huckabay et al. | 423/111 |
| 4,320,098 | 3/1982 | Huckabay et al. | 423/111 |

FOREIGN PATENT DOCUMENTS 535048 12/1956 Canada .......................... 252/321
1091199 11/1967 United Kingdom .......... 252/321

Primary Examiner—Herbert T. Carter
Attorney, Agent, or Firm—Fischer, Tachner & Strauss

[57] ABSTRACT

There is disclosed a method for the treatment of aluminum dross oxides which contain aluminum metal, aluminum carbide, aluminum nitride and salts such as potassium and sodium chloride. The method comprises the thermal treatment of an aqueous suspension of the dross oxides with agitation in the presence of a particulate grinding medium. The method is practiced in a stirred reactor vessel which contains a bed of refractory, ceramic balls that are agitated with a slurry to provide a sufficient abrading action on the aluminum metal particles to remove the aluminum hydroxide coating and continually expose the aluminum metal for reaction with the water. This invention comprises the introduction of a purge gas into the suspension, preferably air, during its thermal treatment to reduce the formation of foam during the treatment and to assist in liberation of ammonia formed by the decomposition of the aluminum nitride.

13 Claims, 2 Drawing Figures

METHOD FOR TREATMENT OF ALUMINUM DROSS OXIDES

BACKGROUND OF THE INVENTION

1. Field of Invention

This invention relates to a method of treating dross aluminum oxides and, in particular, to a method for conditioning the oxides for further reaction.

2. Brief Statement of the Prior Art

Waste aluminum oxides, known as dross aluminum oxides, have accumulated about the countryside in substantial quantities. The oxides contain impurities such as potassium and sodium chlorides, up to about 20 weight percent aluminum metal, aluminum nitride and aluminum carbide. Some attempts have been made to utilize these oxides as a cement ingredient, however, the quantities of dross oxides produced in aluminum smelting operations far exceed the quantities needed by the cement industry. Attempts have been made to purify the aluminum oxides of their contaminants and use them in chemical processing as a substitute for aluminum trihydrate or bauxite, however these attempts heretofore have not achieved any significant commercial acceptance. A method for conditioning of the oxides is disclosed in U.S. Pat. No. 3,955,969 in which the oxides are thermally treated with water to decompose the carbide and nitride contaminants. The treated oxides are suggested as useful as a flux for the steel industry.

In U.S. Pat. Nos. 4,252,776 and 4,320,098, it is disclosed that the dross aluminum oxides can be conditioned for use in the chemical industry by thermal treatment with water in the presence of a refractory grinding medium which is effective to react the aluminum metal to aluminum hydroxide and decompose the aluminum carbide and aluminum nitride impurities.

One of the problems encountered in commercializing the aforementioned treatment is that the aluminum oxides severely foam when treated at elevated temperatures in an aqueous suspension. The foaming is often so severe that most of the powdered aluminum oxides are lifted out of the reaction zone, interrupting the treatment of the oxides.

BRIEF STATEMENT OF THE INVENTION

This invention comprises the thermal treatment of an aqueous suspension of dross aluminum oxides which contain impurities such as aluminum metal in quantities up to about 20 weight percent, and aluminum nitride and aluminum carbide, each in quantities up to about 5 weight percent. Additionally, the dross aluminum oxides contain salts such as sodium and potassium chlorides. The method comprises washing the aluminum oxides to remove the water soluble salts and then treating an aqueous suspension of the aluminum oxides at an elevated temperature with agitation in the presence of refractory, ceramic balls using sufficient agitation to abrade the surface of the aluminum metal and continually expose the aluminum metal to reaction with water until the aluminum metal is substantially reacted to aluminum hydroxide.

The method of this invention comprises introduction of a purge gas into the aqueous suspension during its thermal treatment. The introduction of the purge gas is effective in inhibiting the foaming of the suspension during treatment.

BRIEF DESCRIPTION OF THE DRAWINGS

The invention will be described with reference to the drawings of which.

BRIEF DESCRIPTION OF PREFERRED EMBODIMENTS

Figure 1:
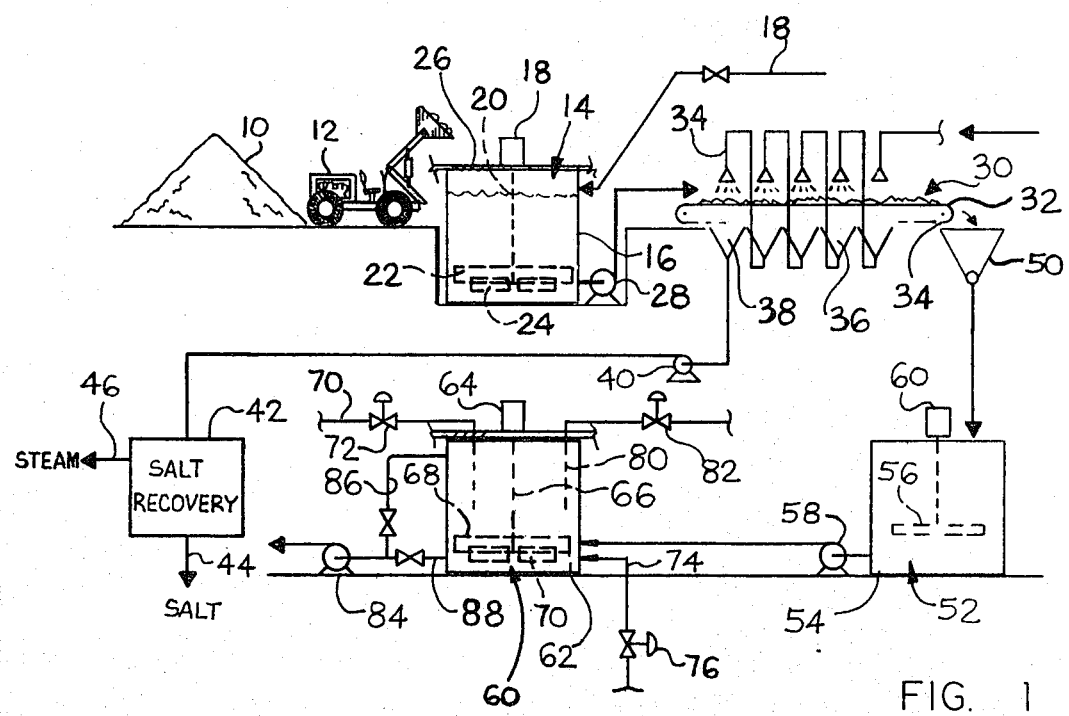
FIG. 1 is a system flow diagram of the treatment method.

Referring to FIG. 1, the salt containing dross aluminum oxides are shown on a stockpile 10 from which the oxides are removed using a conventional solids handling technique such as a front end loader 12 which delivers the oxides to the agitated tank 14. The agitated tank 14 is a generally cylindrical vessel 16 having a centrally mounted agitator drive 18 with a central agitator shaft 20 and a plurality of propellers such as upper propeller 22 and a lower propeller 24. Preferably, the vessel 16 also contains a grinding media in the form of refractory, ceramic particles such as spheres or balls of relatively small diameter, e.g., from about 0.3 to about 1.5 inches diameter, preferably from about 0.6 to about 1 inch diameter. The quantity of ceramic balls used in vessel 16 is preferably about 20 to about 60 percent, preferably from about 30 to 45 percent of the weight of the aluminum oxides maintained in suspension within vessel 16. This amount of grinding media is sufficient to submerge the lowermost propeller blades 24 and to partially submerge the uppermost propeller blades 22. The propeller blades 24 are preferably entirely radial, i.e., having no axial pitch while the propeller blades 22 preferably have a significant axial pitch, e.g., from about 25 to 75 degrees, preferably from about 40 to 60 degrees. Water is introduced into the vessel 16 through line 18 to form a suspension of solids therein, typically suspensions having solids contents from about 30 to about 80 weight percent, preferably from about 55 to about 65 weight percent are employed.

The solids are agitated within the stirred tank 14 at ambient temperatures and the agitation employed in this tank is sufficient to grind up agglomerates which are encountered in the aluminum oxides. Typically, the dross aluminum oxides are screened prior to stockpiling to a particle size passing a 20 mesh and, more commonly, passing approximately a 35 mesh screen. During storage, these solids agglomerate and the agitation employed in tank 14 is sufficient to subdivide or break up the agglomerates. Preferably, the solids are screened through a coarse screen 26 which is laid over the open end of vessel 16. This screen can have an open grid of from 1 to about 3 inches, preferably about 1.5 inches. The screen is used to remove any foreign debris such as wood and rocks which can be manually recovered off screen 26 while the agglomerates of oxides which accumulate on this screen can be mechanically or manually pushed off the screen and into tank 14.

The pulverized oxides form a slurry suspension which is removed by pump 28 and delivered to a suitable salt washing facility. A useful salt washing facility comprises a traveling belt filter 30 which has a continuous, water permeable belt 32 that passes over end rollers such as 34. The solids are deposited on belt 32 and are contacted with a plurality of water sprays such as 34. The wash water is drained from the solids deposited on belt 32 into evacuated chambers such as 36 beneath the belt. Preferably, the wash water is passed concurrently to the flow of the solids in successive washing steps and the resultant salt water or brine is removed from the last filter stage 38 and passed by pump 40 to a salt recovery unit 42. Various salt recovery units can be employed such as heated, rotary dryers or multiple effect evaporators. In either application, the water present in the brine solution is evaporated as steam through line 46, and a slurry of salt crystals is removed from the salt recovery unit through line 44. The salt can be dried for subsequent reuse in the aluminum smelting operations.

The salt-free solids are discharged into a hopper 50 and fed from the hopper into a slurry surge tank 52 which can be a generally cylindrical tank 54 having a propeller 56 driven by a suitable power source 60 at a rate sufficient to agitate the tank contents and maintain the solids in a slurried condition. Alternatively, the suspension can be agitated by discharging air into the bottom of tank 54 through a suitable distributor on the bottom of the tank. The solids concentration in the surge tank 52 can be from about 30 to 80 weight percent, preferably from about 55 to 65 weight percent. The salt-free suspension of aluminum oxides is removed by pump 58 and passed to the oxidizer unit 60. The oxidizer unit 60 includes a generally cylindrical vessel 62 having an agitator assembly with a drive system 64 operatively connected to the vertical and centrally disposed propeller shaft 66 that supports a plurality of superimposed impellers such as 68 and 70. The agitator system of this vessel is substantially the same as that of tank 14, previously described. The lowermost propeller 70 has a plurality of radial blades having substantially no axial pitch, typically with a pitch angle from about 0 to about 5 degrees. The lowermost substantially radial propeller has a diameter which is from about 25 to 65 percent of the diameter of vessel 62. The upper propeller blades 68 have a substantial axial pitch, e.g., from 20 to about 80 degrees, preferably from about 40 to 60 degrees. The vessel 62 is partially filled with the grinding media which is a refractory particulate matter, preferably ceramic balls of small diameters, from about 0.3 to about 1.5, preferably from about 0.6 to about 1 inch. These balls are preferably of alumina, containing from 50 to 100 weight percent anhydrous alumina, preferably at least 85 weight percent alumina with minor amounts of silica, clays, etc.

The dross aluminum oxides are maintained in an agitated suspension in vessel 62 by the action of the propellers 68 and 70. The suspension in vessel 62 is maintained at a reaction temperature, typically at 175 to about 220 degrees F., preferably from about 185 to 210 degrees F. When necessary, and particularly at commencement of the oxidation in vessel 62, heat is supplied to this vessel by steam line 71 controlled by valve 72. The steam discharges directly into vessel 62, below the normal liquid level within this vessel.

The reactions which occur in vessel 62 are the oxidation of the aluminum metal, the reaction of aluminum carbide, and the reaction of aluminum nitrides, in the manner set fOrth in the following emperical equations:

$$2Al + 12H_2O \rightarrow 2\,Al(OH)_3 \cdot 3H_2O + 3H_2$$

$$Al_4C_3 + 24H_2O \rightarrow 4\,Al(OH)_3 \cdot 3H_2O + 3CH_4$$

$$Al_2N_3 + 12H_2O \rightarrow 2\,Al(OH)_3 \cdot 3H_2O + 2NH_3$$

The chief impurity that is present in the aluminum oxides is metallic aluminum which can comprise from about 0.1 to about 25, usually from about 1 to about 5 weight percent (dry basis) of the aluminum oxide solids. Aluminum carbide and aluminum nitride can also be present in these oxides in quantities from about 0.1 to about 5 weight percent, usually from about 0.1 to about 2 weight percent. These reactions are exothermic and there is a appreciable heat release during the treatment in vessel 62. This heat release is sufficient such that when the aluminum metal content is approximately 3 to about 5 weight percent or greater, the heat release compensates for the heat losses from vessel 62 and the reaction will be self-sustaining once it has been initiated. Accordingly, the introduction of steam through line 71 can be practiced intermittently, as required to maintain the temperature.

Vessel 62 is preferably an open vessel and operated at atmospheric pressure. Any excess exothermic heat of reaction can be removed from vessel 62 by suitable means, conveniently by evaporation of water from the vessel and, for this purpose, additional water may be added through line 74 controlled by valve 76 as may be necessary to maintain the desired density of the suspension of solids within the vessel 62.

The reaction of metallic aluminum with water is inhibited by the formation of a protective layer of aluminum hydroxide which envelopes the aluminum metal particles. The high agitation within vessel 62 achieves a continuous and accelerated rate of reaction of the aluminum metal with water by the continuous particle-to-particle attrition between the aluminum oxides and the ceramic balls which are maintained in agitation within vessel 62 by the propellers 68 and 70.

The reaction in vessel 62 is also accelerated by the addition of an alkali metal hydroxide such as sodium, potassium or lithium hydroxide. Preferably sodium hydroxide is employed. The hydroxide is used at low to trace concentrations, typically from about 0.001 to about 1.0, preferably from about 0.07 to about 0.15 weight percent. The alkali metal hydroxide can be added as needed by pouring the solid hydroxide pellets into vessel 62 or, if desired, an aqueous solution of approximately 50 weight percent sodium hydroxide can be preformed and discharged into the vessel with a suitable chemical injection pump. The hydroxide does not function as a reactant in the process and, accordingly, low concentrations of the hydroxide can be used. The hydroxide functions primarily as a source of hydroxyl ligands which complex the aluminum hydroxide and remove the protective aluminum hydroxide film from the metallic aluminum particles and thus accelerate the oxidation by assisting the continuous exposure of the aluminum metal for reaction.

The gases which are evolved by the reaction hydrogen, methane and ammonia can be discharged from the open vessel 62. Alternatively, the gas evolved during the reaction can be treated to recover the ammonia and the hydrogen and methane. The latter can supply heat for the process, e.g., as a source of fuel for the evaporation of the brine in the salt recovery unit 42. Suitable treatment steps for the gas discharged from the vessel 62 comprises passing the gas to a wet scrubber where it is contacted with a spray of water or dilute sulfuric acid to cool and condense water and remove the ammonia. Once the gas has been cooled to about 100 degrees or less, it can be used as a fuel. Alternatively, the gas could be passed to a drying tower where it can be contacted with sulfuric acid to reduce its moisture content to a suitably low value. The dried gas can then be passed to the salt recovery unit as a source of fuel.

The invention also comprises introduction of a purge gas into vessel 62 during the oxidation of the aluminum metal and decomposition of the impurities in this vessel. The inert purge gas can be introduced into vessel 62 through a suitable sparger which can be located, if desired, on the bottom of vessel 62. Alternatively, as illustrated in FIG. 1, a steam conduit 80 can discharge into vessel 62 beneath the liquid level. This conduit is connected through valve 82 to a source of a suitable compressed purge gas, e.g., nitrogen, air, carbon dioxide, etc. Preferably air is introduced into vessel 62 during the reaction at a rate sufficient to inhibit foaming in vessel 62. It has been found that in the absence of the introduction of a purge gas into vessel 62, the suspension of dross aluminum oxides foams severely when it is agitated at the aforementioned reaction temperature. The intensity of this foaming is sufficient that most of the solids of the vessel 62 are discharged out of the open top of the tank. The introduction of the purge gas greatly reduces this foaming and permits the uninterrupted treatment of the dross aluminum oxides in vessel 62.

The dross aluminum oxides are removed from vessel 62 as a slurry of solids having a solids content from about 40 to about 65 weight percent, preferably from about 55 to about 65 weight percent. A slurry pump 84 is provided to withdraw the solids from tank 62. The solids can be withdrawn from the top of tank 62 through line 86, or, alternatively, from the bottom of vessel 62 through line 88. The withdrawn suspension of solids can then be passed to suitable chemical processing, preferably to the aluminum sulfate manufacturing plant such as described in U.S. Pat. Nos. 4,320,098 and 4,252,776.

Figure 2:
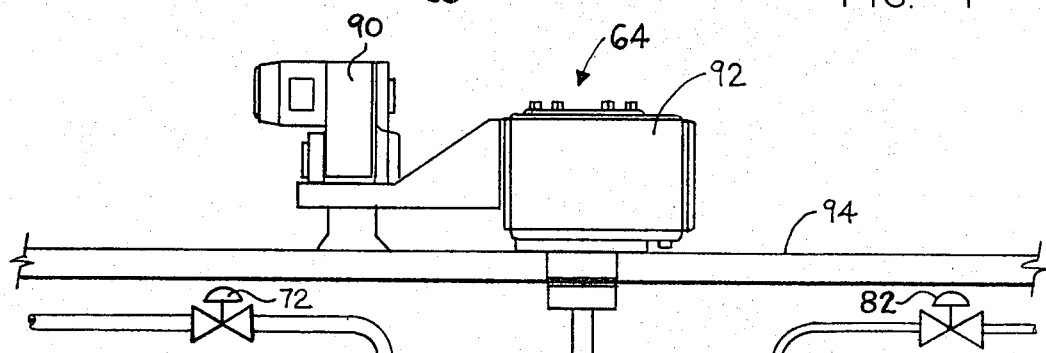
FIG. 2 is an elevational, partial cross-sectional view of a reactor used in the treatment.

Referring now to FIG. 2, the vessel 62 and its agitator will be described in greater detail. As illustrated in FIG. 2, the agitator drive 64 includes an electrically driven motor 90 connected to a variable speed gear box 92 having a right angle drive to the propeller shaft 66. The entire assembly is mounted on a platform 94 which is supported, by standards, above vessel 62. The drive can have a variable speed or can be of a fixed or constant speed output with a speed from 4 to about 30, preferably from about 10 to about 20, revolutions per minute.

The lowermost propeller 70 has a diameter substantially less than the diameter of the superimposed propeller 68. Each of these propellers is a four-bladed propeller. The blades 71 of propeller 70 are entirely radial, i.e., have no axial pitch as apparent from the vertical orientation of the propeller blade 73 in the illustration. The upper propeller 68, however, has a substantial axial pitch and this is indicated by the inclined surface of propeller 69, shown at the preferred angle, 45 degrees. The lowermost propeller is supported close to the bottom of vessel 62. Preferably this propeller is positioned at a distance from 1 to about 3 times the diameter of the ceramic balls 98 which are maintained in vessel 62.

The upper propeller is positioned slightly above the lower, entirely radial propeller. For maximum efficiency, these propellers overlap slightly, i.e., the lower edges of the upper propeller blades are below the upper edges of the lower blades. For this purpose, the blades of these propellers are staggered angularly on shaft 66. Preferably, each propeller has four blades, each at ninety degrees, and the blades of the upper propeller are at 45 degrees to those of the lower propeller. Approximately, ⅛ to about ½ of the upper propeller blades overlap the lower blades, for maximum efficiency. If desired, however, the upper blade can even be entirely above the lower blade, e.g., with a spacing of 1 to about 6 inches, however, this is not preferred since it requires more power to effect agitation in vessel 62.

If desired, vessel 62 can have a ceramic lining to reduce erosion such as ceramic tiles 63 which can line the entire inside wall, or only the lower half of the inside tank wall. The tile, if used, can be refractory, fired tile alumina constituting from 50 to 100 weight percent, preferably over 85 weight percent alumina. This lining isn't essential since experience has shown that even unlined steel vessels have a substantially anticipated life for this service.

The ceramic balls 98 are placed in vessel 62 in a sufficient quantity to completely submerge lower propeller 70 and, preferably, to cover the lower edges of the upper propeller 68. The quantities of ceramic balls maintained in vessel 62 is a function of the content of solids in vessel 62, preferably the ceramic balls should comprise from about 30 to about 50 weight percent of the dry weight of the dross aluminum oxides normally treated in vessel 62.

Vessel 62 can be provided with a large diameter nozzle 100 covered with a blind flange 102 to permit manual clean out or maintenance. Additionally, a plurality of nozzles such as 104, 106 and 108 can be provided for withdrawal of material from the vessel. A nozzle 110 can be located in the upper portion of vessel 62 for removal of product from the upper portions of this vessel.

As previously mentioned, the contents of vessel 62 can be heated by steam introduced through an open-ended discharge conduit 71 which can be secured at a fixed, predetermined position within vessel 62 to discharge beneath the liquid level therein. This conduit can discharge into the lower half of the vessel and thus ensure adequate contacting of the steam with the liquid contents to effect the desired preheating of liquid within vessel 62.

The invention also includes provision to introduce an inert gas into vessel 62 beneath the liquid level therein. For this purpose, an open-ended conduit 80 is positioned in vessel 62, supported from platform 94. Conduit 80 is connected through valve 82 to a source of a suitable purge gas such as compressed air. The conduit 80 is similarly located to discharge the purge gas into the lower half of vessel 62. The conduit can be set to discharge the purge gas at least about 12 inches beneath the liquid level in this vessel, preferably to discharge the purge gas into the lower half of vessel 62. The purge gas can be an inert gas such as nitrogen, carbon dioxide, etc. Preferably, air is added. The purge gas rate can be from 0.001 to about 0.02, preferably from about 0.002 to about 0.007 cubic feet per minute per gallon of suspension in vessel 62.

EXAMPLE

The apparatus of the construction illustrated in FIG. 2 is used to treat dross aluminum oxides which have the following average composition:

TABLE 1

| Ingredient | Weight Percent |
| --- | --- |
| Aluminum metal | 4.0 |
| Aluminum carbide | trace amounts |
| Aluminum nitride | 0.2 |

TABLE 1-continued

| Ingredient | Weight Percent |
| --- | --- |
| *Water soluble salts | 0.4 |

*(sodium and potassium chlorides)

The reaction is commenced by partially filling the reactor vessel with water. The reactor vessel is a cylindrical vessel having a diameter of 12 feet and a height of 11 feet. The reactor is loaded with 12,000 pounds of ceramic spheres (85% alumina) which have a diameter of ¾ inch. The agitator is positioned in this vessel to locate the lower, radial blade two inches above the bottom of the reactor, and the upper, axial propeller is located 8½ inches above the tank bottom. The upper propeller has an axial pitch of 45 degrees.

The drive mechanism is actuated and the water in the vessel 62 is stirred at approximately 14 to 18 revolutions per minute, throughout the reaction period. Steam is introduced into reactor 62 over a period of approximately 50 minutes to heat the water to a temperature of 185 degrees F. The dross aluminum oxides are then conveyed to the reactor vessel and dumped into the vessel with a conventional front-end loader. During this introduction, the solids are manually screened with a steel grading having openings of 2 inches to ensure that foreign debris such as wood and rocks are not introduced into the oxidizer. The dross aluminum oxides are obtained from a stockpile which has accumulated over many years and which contains large agglomerates of the aluminum oxides. The salt originally present in the dross aluminum oxides has mostly been washed from the oxides during weathering in storage and the oxides can be used without a salt washing pretreatment. Typically, agglomerates of solids having major dimensions from 8 to about 14 inches are encountered. Some of these are broken into smaller agglomerates and pushed from the top of the steel grading directly into the reactor tank. Approximately 30 weight percent of the aluminum oxide solids which are introduced into the reactor are agglomerates which are too large to pass through the steel grading. Approximately 27 tons of aluminum oxides are added to the reactor over a period of 6 hours.

Air is introduced through the air sparger at a rate of 20–30 cubic feet per minute and the rate of this addition is adjusted to minimize the formation of foam in the oxidizer. After approximately 2 hours, the entire surface of the oxidizer is covered by a foam blanket approximately 6 inches in thickness. Sodium hydroxide is added periodically to the reactor in 50 pound increments until 200 to 250 pounds have been added.

The agitator drive system has an electrical motor of 7½ horsepower. During the entire reaction period, the maximum power required to maintain the suspension and grinding was 3 to 6 horsepower. In the absence of the lower, radial propeller, the power requirements for this operation are 50 horsepower.

The reactor has an external insulating jacket approximately 3 inches thick to reduce heat losses. The oxides are maintained in the oxidizer vessel for approximately 3 hours after the addition of the last load of solids and the density of the solids is measured and found to be 1.8. Water is then added to dilute the solids to a density of 1.6 and the solids are transferred into a storage tank for processing in an aluminum sulfate plant similar to that described in the aforementioned patents.

The samples are also analyzed to determine that the aluminum metal content of the oxides is reduced from 4.0 weight percent to 0.4 weight percent and that the aluminum carbide and aluminum nitride in the reacted solids are less than detectable levels; less than 0.01 weight percent.

A composite sample of the oxides supplied to the oxidizer and a representative sample of the oxides in the suspension after reaction are collected and inspected by drying and screening to obtain the following screen analysis:

TABLE III

| Screen Size | Input Oxides (before reaction) | Output Oxides (after reaction |
| --- | --- | --- |
| +10 | 29.9% | 0% |
| −10 + 20 | 15.0% | 0% |
| −20 + 40 | 13.1% | 3.2% |
| −40 + 100 | 19.1% | 7.6% |
| −100 | 22.9% | 89.2% |

The treatment in the oxidizer significantly reduces the particle sizes of the oxides. The reacted solids are very fine size powders and this size reduction increases their reactivity for subsequent processing as a raw material source of aluminum oxide.

The invention has been described with reference to the illustrated and presently preferred embodiment. It is not intended that the invention be unduly limited by this disclosure of preferred embodiments. Instead it is intended that the invention be defined by the means, and steps, and their obvious equivalents set forth in the following claims.

What is claimed is:

1. In a method for the treatment of dross aluminum oxides containing from 0.5 to 25 weight percent aluminum metal particles by digestion in water suspension at a solids content from 30 to 80 weight percent, at elevated temperatures from about 175 degrees to 220 degrees F., and under agitation in the presence of a particulate grinding media, the improvement which comprises inhibiting the foaming of the suspension by injecting a purge medium consisting essentially of a gas into said suspension at a rate from 0.0025 to 0.0063 standard cubic feet per minute per gallon of suspension.

2. The method of claim 1 wherein said gas is air.

3. The method of claim 1 wherein said suspension has a solids content from 30 to 75 weight percent.

4. The method of claim 1 wherein said aluminum oxides also contain from 0.1 to 5 weight percent aluminum nitrate particles which are decomposed to release ammonia during the treatment.

5. The method of claim 4 wherein said aluminum oxides also contain from 0.1 to 5 weight percent aluminum carbide particles which are decomposed to release methane during the treatment.

6. The method of claim 1 wherein said suspension is preheated to, and thereafter substantially maintained at, said elevated temperature by the addition thereto of sufficient quantities of said oxides containing at least 3 weight percent aluminum metal to provide an exothermic heat of reaction which compensates for heat losses therefrom.

7. The method of claim 1 wherein said aluminum oxides are of a large size range containing from 5 to 30 weight percent agglomerates having a major dimension greater than 2 inches and a weight majority fraction retained on a 40 mesh screen, and wherein said treatment is conducted for a time sufficient to subdivide said solids until at least 75 weight percent thereof passes a 100 mesh screen.

8. The method of claim 1 wherein said suspension and grinding media are agitated with a stirrer rotated at a speed from 4 to about 30 revolutions per minute.

9. The method of claim 1 wherein said grinding media settles to the bottom of said vessel and is circulated by stirring with a radial-blade stirrer.

10. The method of claim 9 wherein said suspension is agitated by stirring with an axial blade stirrer.

11. The method of claim 10 wherein said suspension and grinding media are agitated by stirring at a power input of from 0.1 to 0.3 horsepower per ton dry weight of oxides.

12. The method of claim 1 wherein said aluminum oxides also contain from 0.1 to 5 weight percent aluminum carbide particles which are decomposed to release methane during the treatment.

13. The method of claim 1 wherein sodium hydroxide is added to said suspension at a concentration from 0.001 to 1.0 weight percent.

* * * * *